United States Patent
Seo et al.

(10) Patent No.: US 12,505,636 B2
(45) Date of Patent: Dec. 23, 2025

(54) METHOD FOR EDITING THREE-DIMENSIONAL VOLUMETRIC DATA

(71) Applicants: Kwangwoon University Industry—Academic Collaboration Foundation, Seoul (KR); YESH COMPANY CO., LTD., Seoul (KR)

(72) Inventors: Young Ho Seo, Seoul (KR); Eui Seok Hwang, Suwon-si (KR)

(73) Assignees: Kwangwoon University Industry-Academic Collaboration Foundation, Seoul (KR); YESH COMPANY CO., LTD., Seoul (KR)

( * ) Notice: Subject to any disclaimer, the term of this patent is extended or adjusted under 35 U.S.C. 154(b) by 181 days.

(21) Appl. No.: 18/391,816

(22) Filed: Dec. 21, 2023

(65) Prior Publication Data
US 2025/0200916 A1    Jun. 19, 2025

(30) Foreign Application Priority Data
Dec. 19, 2023   (KR) .................. 10-2023-0185795

(51) Int. Cl.
  *G06T 19/20*   (2011.01)
  *G06T 7/70*    (2017.01)
  *G06T 13/40*   (2011.01)

(52) U.S. Cl.
  CPC ............. *G06T 19/20* (2013.01); *G06T 7/70* (2017.01); *G06T 13/40* (2013.01);
  (Continued)

(58) Field of Classification Search
  CPC ........... G06T 19/20; G06T 7/70; G06T 13/40; G06T 2207/20044; G06T 2219/2004;
  (Continued)

(56) References Cited

U.S. PATENT DOCUMENTS

| | | | |
|---|---|---|---|
| 2022/0101603 A1 | 3/2022 | Ni et al. | |
| 2023/0274472 A1* | 8/2023 | Liu | G06T 7/70 |
| | | | 345/582 |
| 2024/0212279 A1* | 6/2024 | Lee | G06T 13/40 |

FOREIGN PATENT DOCUMENTS

| | | |
|---|---|---|
| JP | 2011039869 A | 2/2011 |
| KR | 10-2010-0073174 A | 7/2010 |

(Continued)

OTHER PUBLICATIONS

Guo, Kaiwen and Lincoln, Peter and Davidson, et al, The Relightables: Volumetric Performance Capture of Humans with Realistic Relighting, Dec. 2019, ACM Trans. Graph., vol. 38. No. 6, p. 19 https://doi.org/10.1145/3355089.3356571, doi = 10.1145/3355089.3356571.

(Continued)

*Primary Examiner* — Grace Q Li
(74) *Attorney, Agent, or Firm* — NKL LAW; Jae Youn Kim

(57) ABSTRACT

Disclosed is an editing method for edit 3D volumetric data to edit 3D mesh data in which head parts are removed from the volumetric data, an SMPL model is generated from the volumetric data, a 3D model is generated by transferring the head parts to the SMPL model, and then editing is performed, and includes: (a) receiving a 3D mesh sequence composed of a series of continuous frames; (b) estimating a 3D pose from a sequence of the 3D mesh; (c) separating a head part from a 3D mesh of a keyframe; (d) estimating a 3D mesh and pose data of an SMPL model; (e) generating a 3D base model of the keyframe; (f) editing the estimated 3D pose of the keyframes, and generating a sequence of 3D poses; and (g) editing the 3D base model to generate a 3D editing model and animating the 3D editing model.

9 Claims, 11 Drawing Sheets

(52) U.S. Cl.
CPC ............... *G06T 2207/20044* (2013.01); *G06T 2219/2004* (2013.01); *G06T 2219/2016* (2013.01)

(58) Field of Classification Search
CPC ... G06T 2219/2016; G06T 2207/30196; G06T 2219/2021; G06T 17/00; G06T 19/00; G06T 13/20
See application file for complete search history.

(56) References Cited

FOREIGN PATENT DOCUMENTS

| | | |
|---|---|---|
| KR | 10-2012-0071299 A | 7/2012 |
| KR | 10-2023-0079256 A | 6/2023 |

OTHER PUBLICATIONS

Pietroszek, Krzysztof and Eckhardt, Christian, Volumetric Capture for Narrative Films, 26th ACM Symposium on Virtual Reality Software and Technology, Nov. 2020, https://doi.org/10.1145/3385956.3422116, doi = 10.1145/3385956.3422116.

Schreer, Oliver and Feldmann, Ingo and Renault, et al., Capture and 3D Video Processing of Volumetric Video, 2019 IEEE International Conference on Image Processing (ICIP), 2019, 4310-4314. doi=10.1109/ ICIP.2019.8803576.

Cao, Zhe, et al. "OpenPose: realtime multi-person 2D pose estimation using Part Affinity Fields." arXiv preprint arXiv:1812.08008 (2018).

J. M. Singh and R. Ramachandra, "3D Face Morphing Attacks: Generation, Vulnerability and Detection," in IEEE Transactions on Biometrics, Behavior, and Identity Science, doi: 10.1109/TBIOM.2023.3324684, Aug. 2015.

Choutas, Vasileios, et al. "Monocular expressive body regression through body-driven attention." Computer Vision—ECCV 2020: 16th European Conference, Glasgow, UK, Aug. 23-28, 2020, Proceedings, Part X 16. Springer International Publishing, Aug. 20, 2020.

* cited by examiner

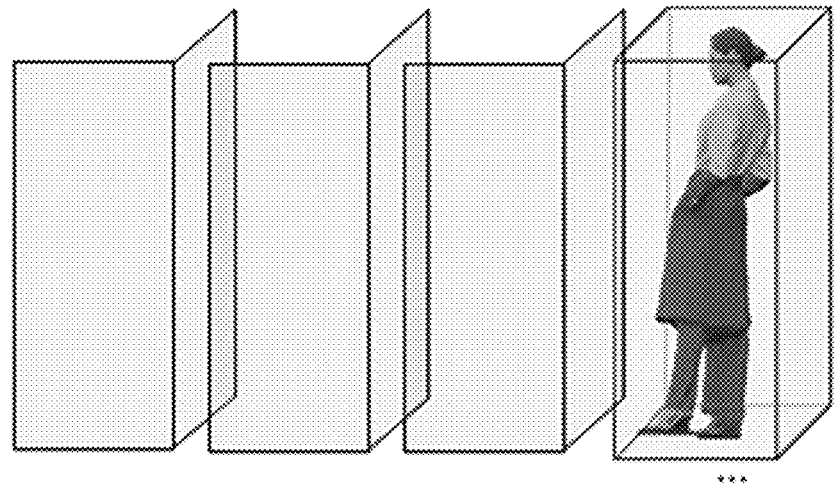
FIG. 4(a)
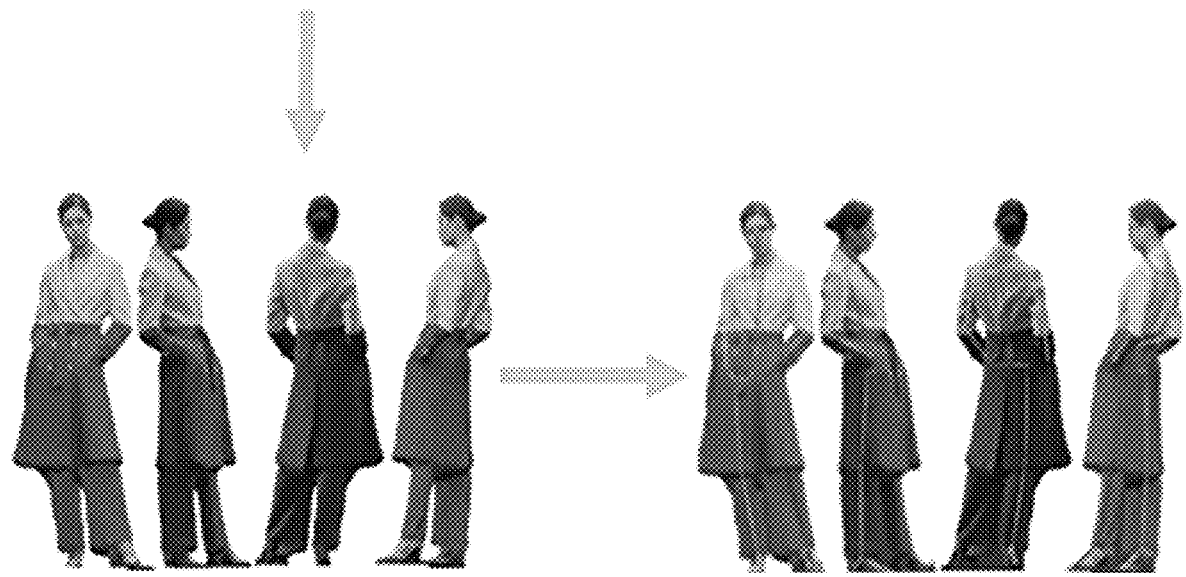
FIG. 4(b)          FIG. 4(c)

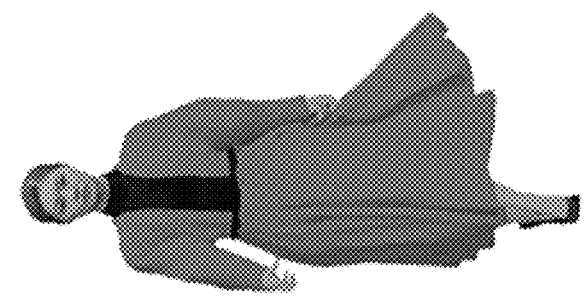
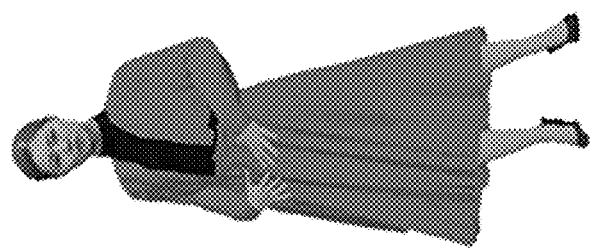
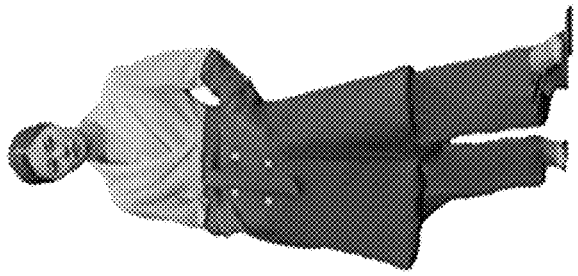
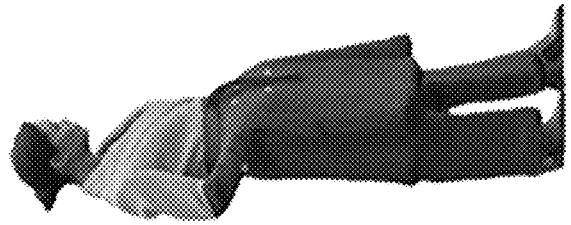
FIG. 12(a)
FIG. 12(b)

METHOD FOR EDITING THREE-DIMENSIONAL VOLUMETRIC DATA

BACKGROUND OF THE INVENTION

1. Field of the Invention

The present invention relates to an editing method for edit three-dimensional (3D) volumetric data to edit 3D mesh data composed of a sequence of 3D models, in which head parts are removed from the volumetric data, a skinned multi-person linear (SMPL) model is generated from the volumetric data, a 3D model is generated by transferring the head parts to the SMPL model, and then editing such as fitting, rigging and retargeting is performed.

2. Description of the Related Art

Multi-view cameras are used to take a series of temporal films and the filmed multi-view images are combined in the same time sequence to generate one 3D mesh model. 3D mesh models generated as described above are used to form a sequence in a time base. The sequence of the 3D mesh models is widely used in various content production fields since the sequence can contain the vivid appearances and motions of subjects taken as a video. In general, the above data is referred to as 3D volumetric data (see non-patent document 1-4).

Since the 3D volumetric data is produced continuously in the time base by synthesizing a subject into a 3D mesh form using a plurality of cameras, it is almost impossible to edit the filmed subject. In other words, the 3D volumetric sequence has the advantage of being able to record the appearance and motion of the subject to be filmed as it is, however, has the disadvantage that editing and modification are very difficult. Since the 3D mesh data is continuously present over time, 3D mesh models present within a large number of frames are required to be modified in order to modify a single 3D mesh model.

In general, the 3D mesh data obtained by synthesizing the multi-view images in a photometric scheme has structures (or topologies) having different meshes. In other words, one object synthesized continuously over time may look having the same appearance, however, each frame has a different mesh topology.

Accordingly, it requires a high cost and a long time to consistently modify the 3D mesh having the above temporal polymorphism.

RELATED ART DOCUMENT

Non-Patent Document (Non-Patent Document 1) Guo, Kaiwen and Lincoln, Peter and Davidson, et al, The Relightables: Volumetric Performance Capture of Humans with Realistic Relighting, December 2019, ACM Trans. Graph., vol. 38. no. 6, p. 19 https://doi.org/10.1145/3355089.3356571, doi=10.1145/3355089.3356571

(Non-Patent Document 2) Pietroszek, Krzysztof and Eckhardt, Christian, Volumetric Capture for Narrative Films, 26th ACM Symposium on Virtual Reality Software and Technology, 2020, https://doi.org/10.1145/3385956.3422116, doi=10.1145/3385956.3422116

(Non-Patent Document 3) Schreer, Oliver and Feldmann, Ingo and Ebner, et al, Advanced Volumetric Capture and Processing, SMPTE Motion Imaging Journal, 2019, vol. 128, no. 5, 18-24, doi=10.5594/JMI.2019.2906835

(Non-Patent Document 4) Schreer, Oliver and Feldmann, Ingo and Renault, et al, Capture and 3D Video Processing of Volumetric Video, 2019 IEEE International Conference on Image Processing (ICIP), 2019, 4310-4314.doi=10.1109/ICIP.2019.8803576

(Non-Patent Document 5) Cao, Zhe, et al., "OpenPose: realtime multi-person 2D pose estimation using Part Affinity Fields." arXiv preprint arXiv: 1812.08008 (2018).

(Non-Patent Document 6) J. M. Singh and R. Ramachandra, "3D Face Morphing Attacks: Generation, Vulnerability and Detection," in IEEE Transactions on Biometrics, Behavior, and Identity Science, doi: 10.1109/TBIOM.2023.3324684.

(Non-Patent Document 7) Choutas, Vasileios, et al., "Monocular expressive body regression through body-driven attention." Computer Vision-ECCV 2020: 16th European Conference, Glasgow, UK, Aug. 23-28, 2020, Proceedings, Part X 16. Springer International Publishing, 2020.

SUMMARY OF THE INVENTION

In order to solve the above-described problems, the present invention provides a method for editing 3D volumetric data to edit 3D mesh data composed of a sequence of 3D models, in which head parts are removed from the volumetric data, an SMPL model is generated from the volumetric data, a 3D model is generated by transferring the head parts to the SMPL model, and then editing such as fitting, rigging and retargeting is performed.

In order to achieve the above problem, the present invention relates to a method for editing 3D volumetric data, which includes the steps of: (a) receiving a 3D mesh sequence composed of a series of continuous frames; (b) estimating a 3D pose composed of joints and bones from a sequence of the 3D mesh; (c) separating a head part from a 3D mesh of a keyframe using the 3D pose; (d) estimating a 3D mesh and pose data of an SMPL model with respect to a specific keyframe of the 3D mesh sequence; (e) generating a 3D base model of the keyframe by transferring the head part to the 3D mesh of the SMPL model; (f) editing the estimated 3D pose of the keyframes, and generating a sequence of 3D poses of the entire frames from the 3D poses of the edited keyframes; and (g) editing the 3D base model of the keyframe to generate a 3D editing model, and animating the 3D editing model by applying the sequence of the 3D poses of the entire frame.

In addition, in the method for editing 3D volumetric data according to the present invention, step (b) includes: generating projection images of the 3D mesh viewed from at least four directions, extracting a position of a 2D joint in the projection images by using an OpenPose library, and generating a position for a 3D joint by calculating intersection points in a three dimension.

In addition, in the method for editing 3D volumetric data according to the present invention, step (c) includes: calculating a vector from a head joint to a neck joint as a direction vector of a skeleton, calculating a direction vector of a vertex from a predetermined point on the skeleton to a mesh vertex, and calculating an angle between the direction vector of the skeleton and the direction vector of the vertex, thereby separating a head part.

In addition, in the method for editing 3D volumetric data according to the present invention, step (c) includes: removing corresponding vertices and faces of other areas when a mesh of the head part contains the other areas after the head part is separated by calculating the angle between the direction vectors, detecting a position and coordinates of a closest vertex among vertices of the head parts from vertices of an excluded part corresponding to a head area required to be separated in which a head mesh is separated with distortion, and moving the detected vertex to the distorted portion.

In addition, in the method for editing 3D volumetric data according to the present invention, step (d) includes: projecting a 3D mesh of a specific frame of the 3D mesh sequence onto a two-dimensional (2D) plane to obtain a 2D image, and estimating an SMPL model from a 2D image obtained using a signal processing or a deep learning model.

In addition, in the method for editing 3D volumetric data according to the present invention, step (f) includes: estimating a 3D pose of keyframes from each 3D mesh of a series of keyframes to estimate a sequence of 3D poses of the series of keyframes; editing a sequence of 3D poses of the estimated keyframes to generate a sequence of keyframes of a new 3D pose; and estimating a 3D pose of entire frames from the keyframes of the new 3D pose to generate a sequence of 3D poses of the entire frames.

In addition, in step (f) in the method for editing 3D volumetric data according to the present invention, the editing of the sequence of the 3D poses includes editing the sequence of 3D poses of the keyframe, in which an order of the 3D poses is changed, or another 3D pose is inserted or an existing 3D pose is deleted in the sequence.

In addition, in step (f) in the method for editing 3D volumetric data according to the present invention, the sequence of the 3D poses of the entire frames is generated by estimating 3D poses of intermediate frames by interpolation from the keyframes of the 3D poses.

In addition, step (g) of the method for editing 3D volumetric data according to the present invention includes: animating the 3D editing model by fitting a costume to the 3D base model to generate a 3D editing model, rigging the 3D editing model with a pose of the SMPL model, and using motion-retargeting.

In addition, in step (g) of the method for editing 3D volumetric data according to the present invention includes: retargeting a 3D editing model of a specific keyframe by using a 3D pose sequence from a corresponding frame to a next frame.

In addition, in step (g) of the method for editing 3D volumetric data according to the present invention, an order of the keyframes of the 3D editing model depends on the order of the pose sequence.

According to the above-described method for editing 3D volumetric data of the present invention, the head part is separated from the volumetric data and then transferred to the SMPL model to generate and edit a 3D model, so that editing work, such as costume-fitting and rigging, can be easily implemented.

BRIEF DESCRIPTION OF THE DRAWINGS

FIG. 4(a)-4(c) show exemplary screens illustrating a process of estimating the pose of the 3D mesh according to one embodiment of the present invention, and includes an example screen for (a) a 3D volumetric sequence, (b) a projected image, and (c) a 2D pose image.

FIGS. 12(a) and 12(b) show exemplary images for an original 3D volumetric sequence and an edited 3D volumetric sequence according to one embodiment of the present invention.

DETAILED DESCRIPTION OF THE INVENTION

Figure 1A:
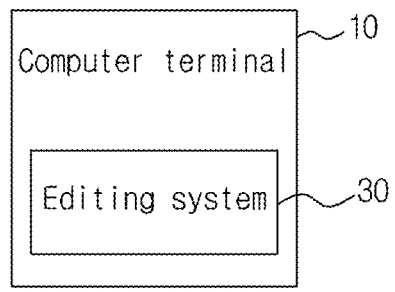
FIGS. 1(a) and 1(b) show block diagrams of the configuration of an overall system for embodying the present invention.

Hereinafter, embodiments for implementing the present invention will be described with reference to the drawings.

In addition, the same parts for describing the present invention may be denoted by the same reference numerals, and the repeated description thereof will be omitted.

First, examples of the configuration of an entire system for embodying the present invention will be described with reference to FIGS. 1(a) and 1(b).

Figure 1B:
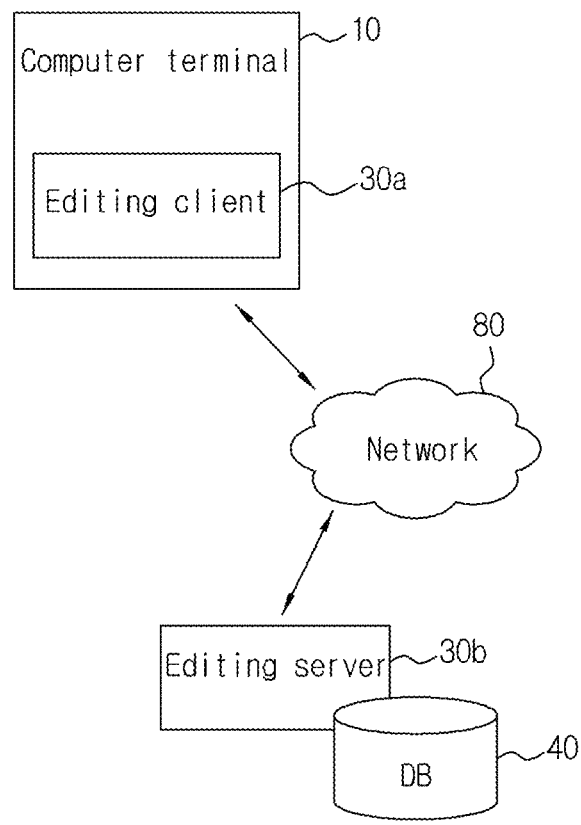

As shown in FIG. 1(a), a method for editing 3D volumetric data according to the present invention (hereinafter, referred to as the editing method) may be implemented as a program system on a computer terminal 10 that receives and edits a 3D mesh sequence.

In other words, the editing method may be implemented as a program system 30 on the computer terminal 10, such as a PC, a smartphone, or a tablet PC. Particularly, the editing method may be configured as a program system and installed and executed in the computer terminal 10. The editing method provides a service of editing the 3D mesh sequence by using hardware or software resources of the computer terminal 10.

In addition, as another example as shown in FIG. 1(*b*), the editing method may be configured and executed as a server-client system composed of an editing client 30*a* on the computer terminal 10 and an editing server 30*b*.

Meanwhile, the editing client 30*a* and the editing server 30*b* may be implemented according to a typical configuration scheme between clients and a server. In other words, functions of the entire system may be divided based on the performance of clients or the amount of communication with a server. The editing system described later may be implemented in various forms of sharing according to the configuration scheme of the server-client.

Meanwhile, as another example, the editing method may be implemented while being configured as one electronic circuit, such as an application specific integrated circuit (ASIC), in addition to being configured as a program to operate on a general purpose computer. Alternatively, the editing method may be developed as a dedicated computer terminal that exclusively processes editing of a 3D mesh sequence having stable colors. Other possible format may also be implemented.

Next, The method for editing 3D volumetric data according to one embodiment of the present invention will be described with reference to FIG. 2.

Figure 2:
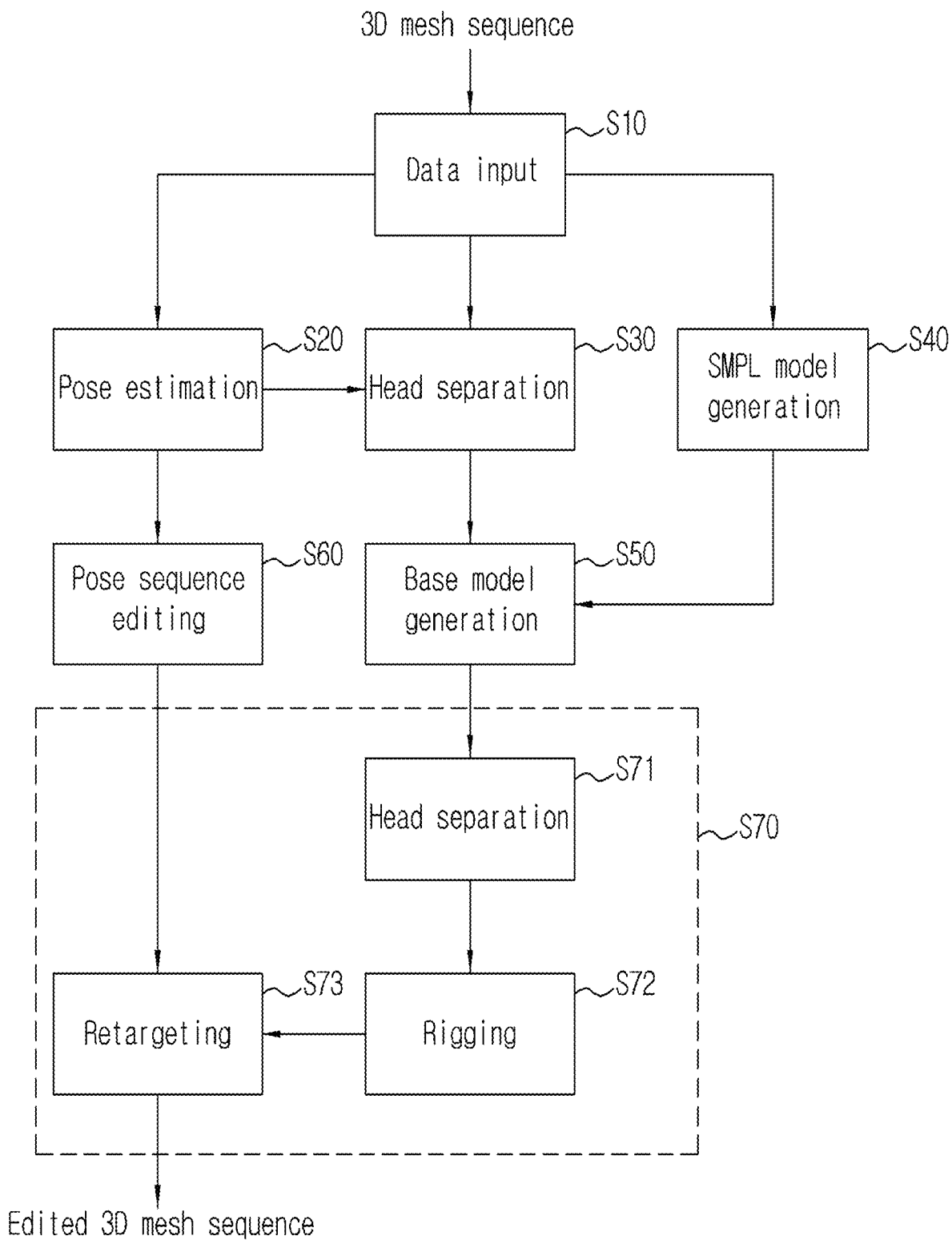
FIG. 2 is a flowchart explaining a method for editing 3D volumetric data according to one embodiment of the present invention.

As shown in FIG. 2, the method for editing 3D volumetric data according to the present invention includes the steps of receiving a 3D mesh sequence (S10), estimating a pose of the 3D mesh sequence (S20), separating a head part based on pose information (S30), generating an SMPL model from the 3D mesh sequence (S40), generating a 3D base model (S50), and editing the 3D base model (S70). In addition, the editing step (S70) is specifically configured to include: fitting costumes to the 3D base model (S71), rigging the 3D base model fitted with the costumes (S72), and retargeting through the rigging (S73). In addition, the method may be configured to further include editing a sequence of 3D poses (S60).

In summary, when 3D volumetric data generated from a multi-view camera is input, a head is separated, and an SMPL model is generated from the 3D volumetric data. In addition, the head part is transferred to the SMPL model to generate a body, and costumes are applied to the generated body, so that a new 3D base model having the body shape and face as an original model is generated. After skeleton and joint information is inserted into the 3D base model, various source motions are input, so that a new 3D volumetric sequence is generated.

First, the 3D volumetric data, that is, a 3D mesh sequence is input (S10).

The 3D mesh sequence or the 3D volumetric data is 3D video data of a person and composed of a 3D mesh of multiple frames on continuous time.

Particularly, for images of a series of consecutive frames captured by multi-view cameras, a 3D mesh model is generated each of the frames. The 3D mesh sequence is a sequence of frames of the generated 3D mesh model.

The 3D mesh of each frame corresponds to a model (or a body model) expressing a person as a mesh.

Meanwhile, The series of frames may be divided into keyframes and intermediate frames. The keyframes are set by skipping a predetermined number of frames. For example, one keyframe may be set for every 10 consecutive frames. in addition, the intermediate frames represent frames present between the keyframes.

Next, A pose of the 3D model, in particular, 3D skeleton information including joints (nodes) and bones (skeletons), is estimated from the 3D mesh (S20).

Figure 3:
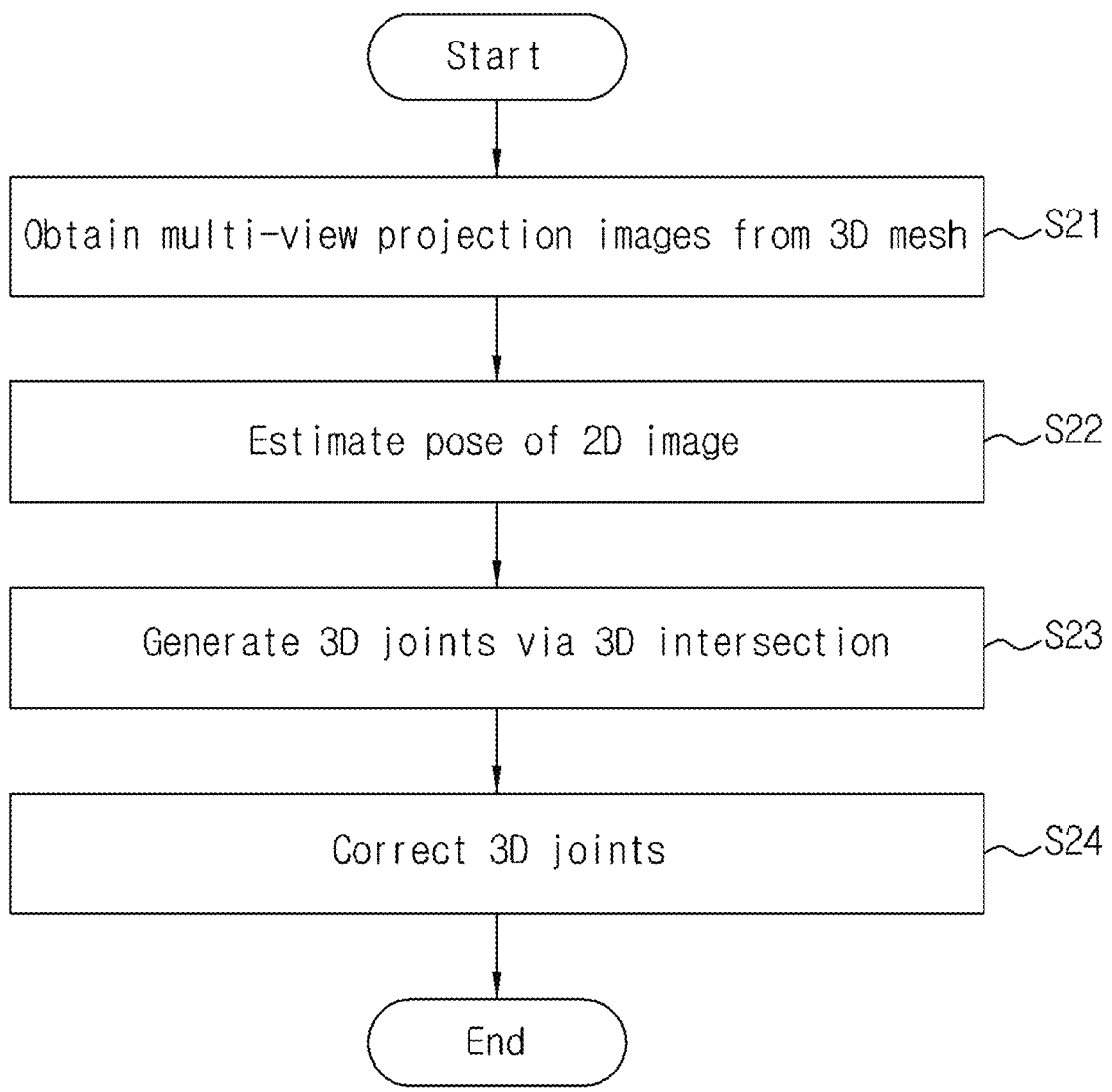
FIG. 3 is a flowchart illustrating a method for estimating a pose of a 3D mesh according to one embodiment of the present invention.

As shown in FIGS. 3 and 4(*a*)-4(*c*), first, projection images (multi-view) of the 3D mesh viewed in multiple directions (four directions such as front, rear, left and right directions) are generated to estimate a 3D pose of the 3D mesh (S21). Next, positions of 2D joints in the projection images are extracted using an OpenPose library (S22), and approximate positions of the 3D joints are generated by calculating intersection points in a three dimension (S23). Finally, a post-processing procedure is performed for extracting positions of high-precision 3D joints (S24).

Meanwhile, a pose of the 3D mesh is estimated for each frame as a unit.

First, the step of obtaining the projection images (S21) will be described.

When positions of 2D joints are estimated with the OpenPose for the projection images in multiple directions, the accuracy of the joint position estimated from the image projected from the front direction may be the highest. Thus, a spatial distribution of 3D coordinates of points constituting the 3D mesh is analyzed to find the front of the 3D mesh, and the front direction is rotated to be parallel to a Z-axis direction. In order to find the front direction, a principal component analysis (PCA) is used. The principal component analysis is used to find a principal component of distributed data.

When the PCA is applied to the 3D mesh, 3D vectors for x, y, and z axes, which may most simply represent the distribution of the 3D mesh, may be obtained. Since a y-axis distribution serving as a vertical direction of an object is unnecessary to find the front, the 3D mesh is projected on an x-z plane, and the PCA is performed in this 2D plane. In the PCA, a covariance matrix is found first, and two eigenvectors for the matrix are obtained. A vector having a small eigenvalue from the two obtained eigenvectors indicates the front direction. The vectors found through the PCA are used and the front of the 3D mesh is rotated to be the z-axis.

After the front of the object is found, an AABB for determining a projection plane on a space is set. During a process of projecting the object from a three dimension to a 2D plane, coordinates from a world coordinate system are converted to coordinates on a projection plane through a model view projection (MVP) matrix, which is a 4×4 matrix.

Next, The step S22 of estimating the 2D pose in each of the projected 2D images will be described.

When four projection images are generated, 2D skeletons are extracted using the OpenPose (see Non-Patent Document 5).

The OpenPose refers to a project published by IEEE Conference on Computer Vision and Pattern Recognition (CVPR) 2017 and is a method developed at the University of Carnegie-Mellon in the United States. The OpenPose is a library based on a convolutional neural network (CNN) and capable of extracting features of bodies, hands, and faces of several persons from photographs in real time.

The characteristic of the above project is to quickly find poses of multiple persons. Before the OpenPose is announced, a top-down approach, which repeats detecting each person in a photograph and finding a pose for the detected person, has been mainly used to estimate poses of multiple persons.

The OpenPose is a type of bottom-up approach and improved in performance without repetitive processing. The bottom-up approach is an approach of estimating joints of all persons, tracing positions of joints, and regenerating the joints to positions corresponding to each person. In general, the bottom-up approach has a problem of determining a person to which joints belong. In order to compensate for the problem, the OpenPose uses part affinity fields capable of estimating a person to which a body part belongs.

The result of extracting the skeleton using the OpenPose is output as image and JavaScript object notation (JSON) files.

Next, the step S23 of generating the 3D pose through 3D intersection and the step S24 of correcting will be described.

Figure 5B:
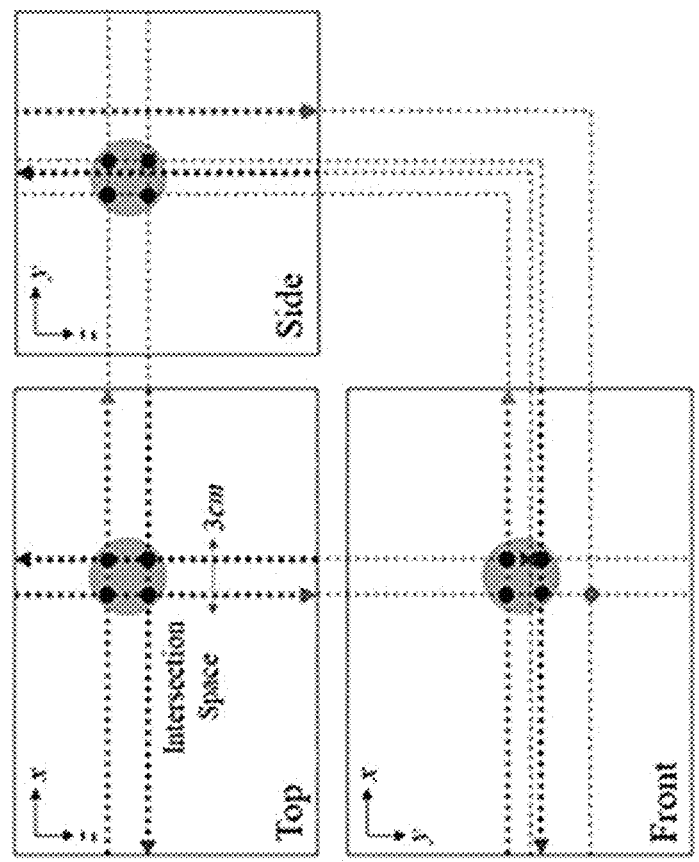
FIGS. 5(a) and 5(b) show exemplary diagrams illustrating a process of estimating the 3D pose in the 3D mesh according to one embodiment of the present invention, and includes (a) a projection image of an axis-aligned bounding box (AABB), and (b) pose errors.
Figure 5A:
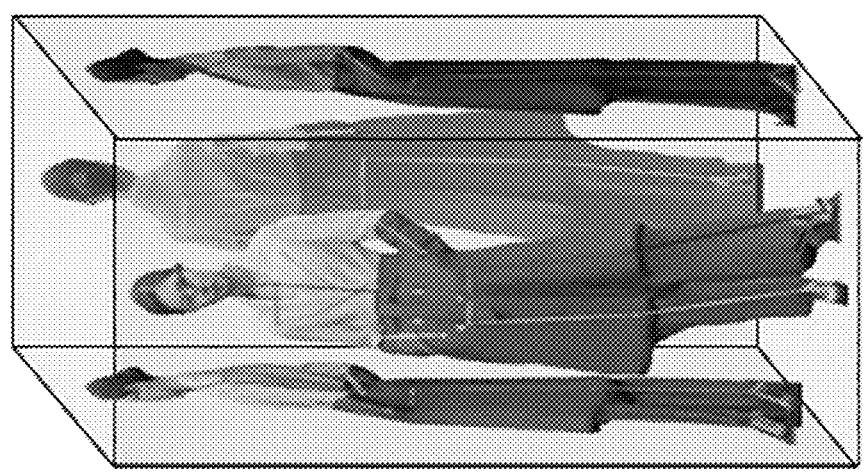

After a process of restoring from a 2D skeleton pixel coordinate system back to a 3D coordinate system, extracted joint coordinates are calculated on four projection planes located in a space. When matching coordinates on the four planes are connected, four coordinates intersecting in the space are obtained. FIG. 5(a) illustrates that a left shoulder 3D joint of a 3D body model is extracted.

Meanwhile, 2D pose estimation always has an error, and the error causes a projection line that deviates from an intersection space. As shown in FIG. 5(b), it can be confirmed that a red projection straight line at a rear side deviates from the intersection space when checked from a front and a side. Experimentally, a diameter of the intersection space is set to 3 cm. In other words, when a 3D virtual sphere is defined and then a virtual projection straight line does not pass through the space, a node by the virtual projection straight line are not included in the calculation of integrating 3D nodes.

In other words, an average point of the intersection space is set as a center, only candidate coordinates within a predetermined range from the center (e.g., a sphere having a diameter 1 or the like) are selected, and other coordinates are excluded.

After points at each view-point for the 3D nodes are defined by using the unremoved candidate coordinates, average coordinates are calculated. X and z coordinates are determined on the top and y coordinates are determined on the side. The calculated x, y and z coordinates are required to match with x and y coordinates on the front. The above process is shown in FIG. 5(b).

FIG. 4(c) visually displays results of applying a stone for one frame to a 3D model.

Meanwhile, a pose is obtained from a specific frame of a 3D mesh sequence or a 3D mesh of each keyframe.

Next, a head part is separated from the 3D mesh of the volumetric metric data by using pose information or joint information (S30). In other words, a mesh area corresponding to the head part is separated from the 3D mesh.

The separation work is divided into primary and secondary works. in the primary work, a head area is separated using a directional vector between the skeleton and the mesh vertices. In the secondary work, the head area is divided more precisely based on the results of the primary work.

First, the primary separation work will be described.

Figure 6:
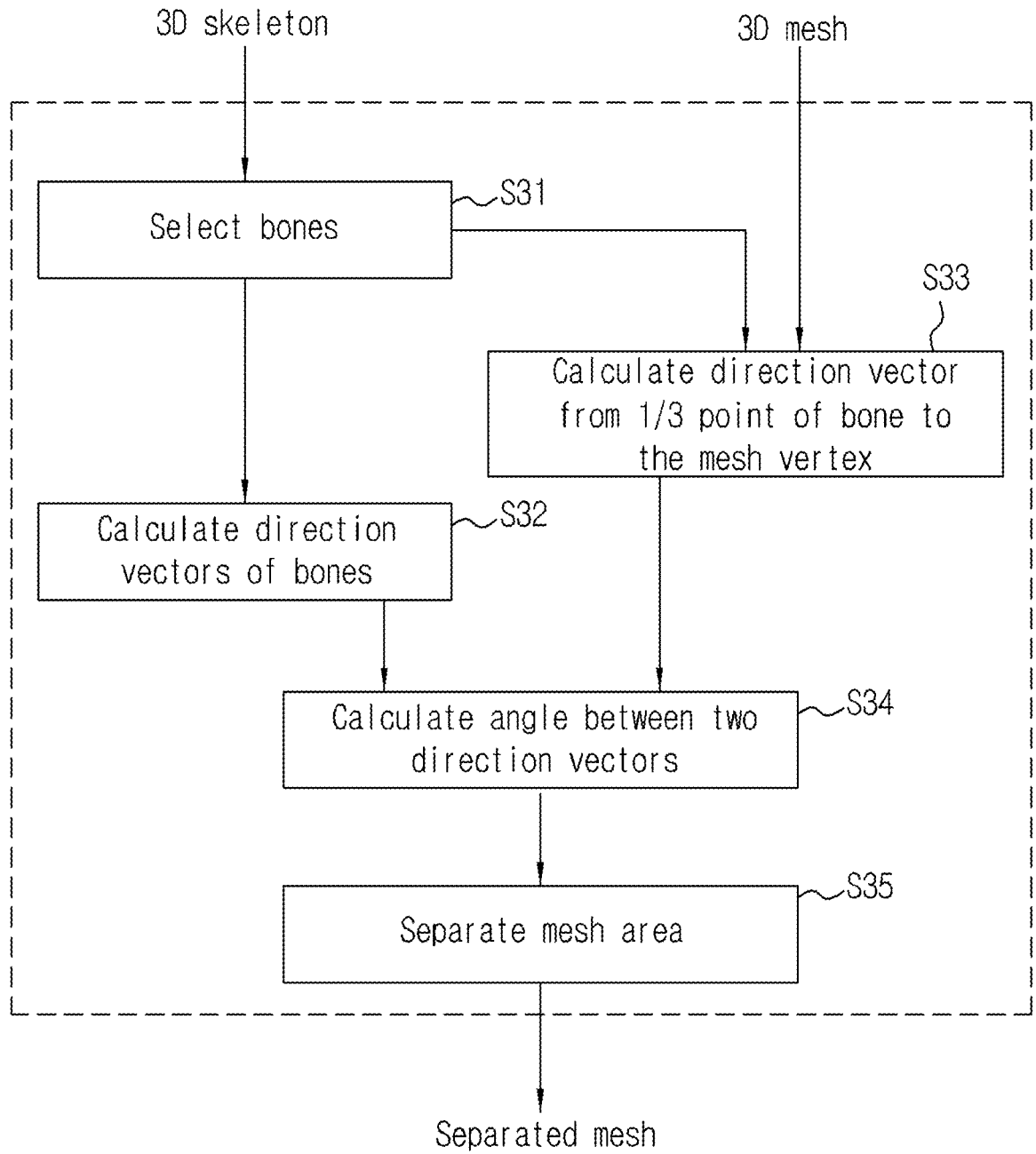
FIG. 6 is a detailed flow chart explaining steps of separating the head from the 3D mesh according to one embodiment of the present invention.
Figures 7A, 7B, 7C, 7D:
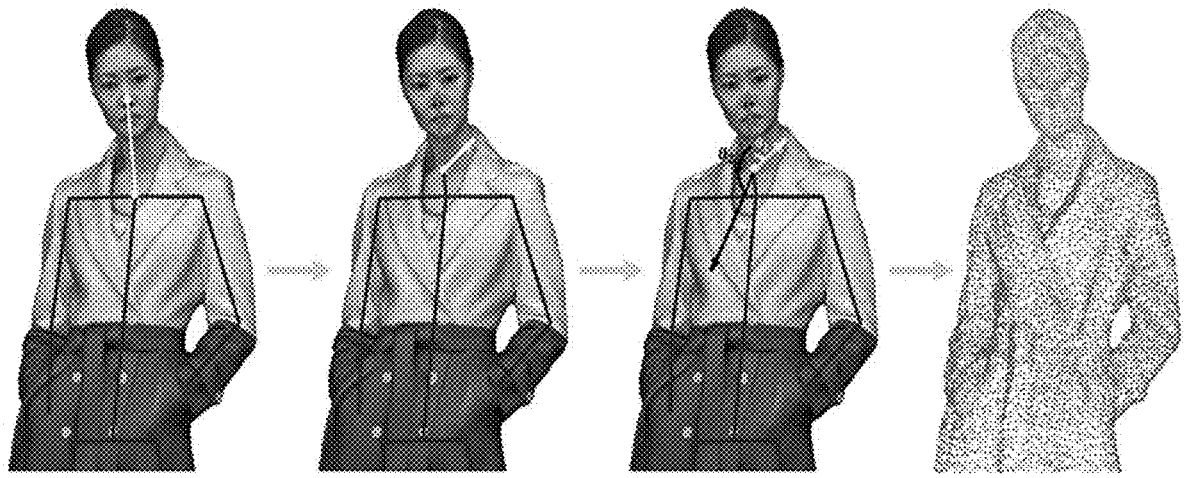
FIG. 7(a)-7(d) show exemplary images illustrating a process of separating the head from the 3D mesh according to one embodiment of the present invention, and includes (a) selecting bones and calculating direction vectors, (b) calculating a direction vector from a third point of the bone to a vertex, (c) calculating an angle between two direction vectors, and (d) separating a head part.

As shown in FIG. 6, the process of separating the mesh area is performed by calculating a direction vector of each skeleton using 3D coordinates of two joints constituting each skeleton.

First, in order to separate the head from the torso, a skeleton connecting the head to the torso (a skeleton connecting a neck joint to a head joint) is selected (S31). Next, a vector directed from the neck joint to the head joint is calculated as a direction vector of the skeleton (S32). In addition, a direction vector from a start point of the skeleton toward a vertex of each mesh (hereinafter, a direction vector of a vertex) is calculated (S33).

Next, an angle between the direction vector of the skeleton and the direction vector of the vertex is calculated (S34), and the head part is separated with separation as a point of a corresponding bone when the angle is within 90 degrees (S35).

As shown in FIG. 7(a)-7(d), a direction vector is calculated from the ⅓ point of the skeleton (⅓ point from the neck joint) to the mesh vertex.

Particularly, the separation process for the head is performed on a 3D mesh of a specific frame of the 3D mesh sequence for previously obtaining the pose.

Next, the secondary separation work or a correction work will be described.

For the secondary separation work, the improperly separated error portion resulting from the primary separation work is corrected, so that a mesh in a more delicately separated area (or head regions) is obtained.

Figure 8:
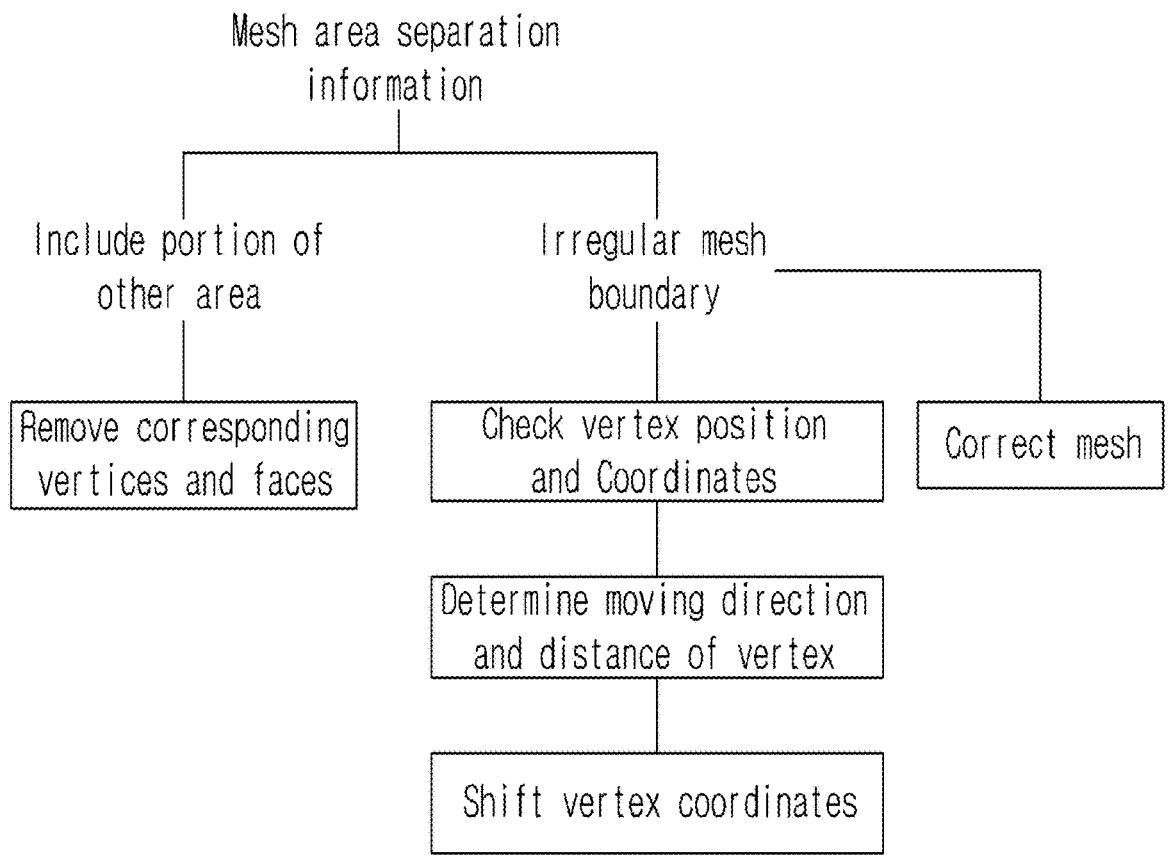
FIG. 8 is a flowchart illustrating a method for correcting a separated mesh according to one embodiment of the present invention.

As shown in FIG. 8, when the head mesh separated according to the primary separation process includes a portion of other area (e.g., body area portion or the like), corresponding vertices and faces included in the other area are removed.

In addition, when the head mesh is distorted and separated because the part corresponding to the head area to be separated is excluded, a position and coordinates of a vertex closest (among vertices of the head) are detected from the vertices of the excluded area, and the detected vertices are excluded and moved to the distorted portion.

Meanwhile, preferably, the other area portion or the distorted and separated portion may be selected and input by an operator. In other words, the operator may check the result of the primary separation work to select and input the other area or distorted and separated portion. The above-described correction work is automatically performed according to the input of the operator.

Figure 9C:
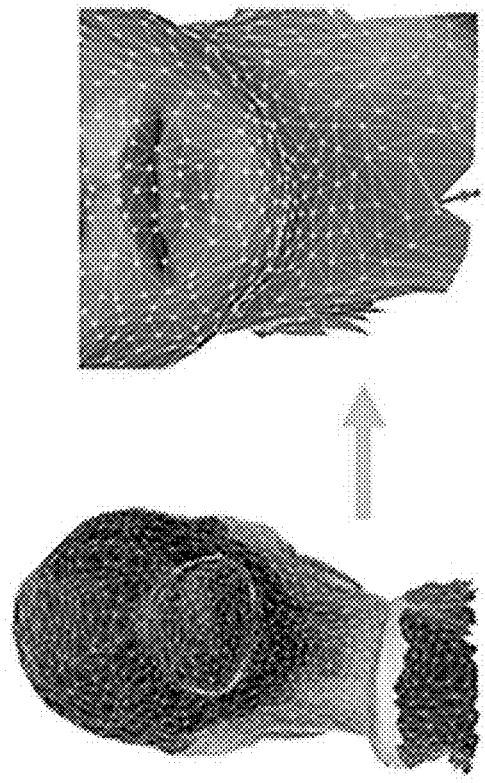
FIG. 9(a)-9(e) show exemplary images of the process of correcting the separated head according to one embodiment of the present invention, and includes (a) a separation result of a volumetric primary area, (b) a removal of vertices and faces, (c) a shift of coordinates of the vertices, (d) a mesh of finally corrected portions, and (e) a mesh of a finally corrected head.
Figure 9B:
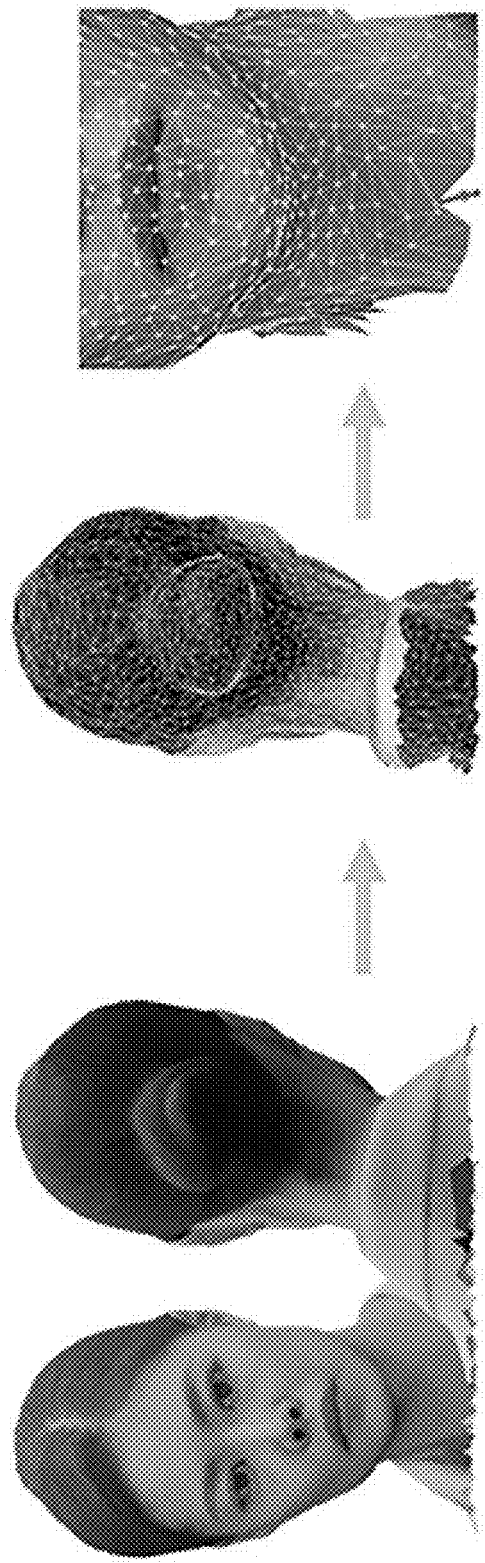
Figure 9E:
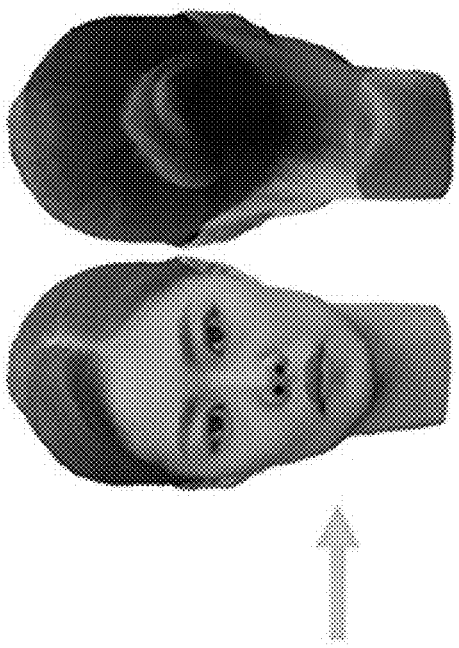
Figure 9A:
Figure 9D:
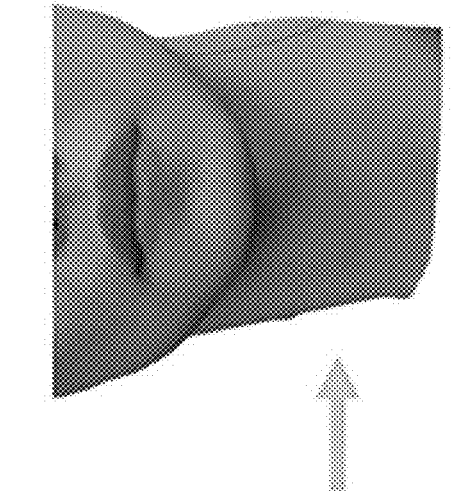

FIG. 9(a)-9(e) show exemplary images of the corrected process. FIG. 9(a) shows a result image obtained by the primary area separation work. FIG. 9(b) shows a removal of vertices and faces of the other area portion. FIG. 9(c) shows a shift of the coordinates of vertices. FIG. 9(d) shows a mesh of the final corrected portion. FIG. 9(e) shows a mesh of a finally corrected head.

Meanwhile, the head separation work may be performed for each 3D mesh of a specific frame or each keyframe. In other words, the head part may be separated for each keyframe.

Next, an SMPL model is generated from the 3D mesh sequence (S40).

Signal processing technology or deep learning network is used, so that a body pose and shape, face, and hand are estimated from an RGB image of the 3D volumetric data, thereby generating a 3D model in an SMPL-X manner.

In other words, a 2D image (RGB image) is obtained (through projection on a 2D plane) from a 3D mesh of a specific frame in the 3D mesh sequence. In addition, a signal processing or a deep learning model is used, so that a body, face, and hand of a person are captured from the 2D image to generate a 3D object in an SMPL-X format. When an algorithm or a deep learning network capable of generating a 2D image and an SMPL mesh is used, an SMPL mesh model may be generated.

Figure 10:
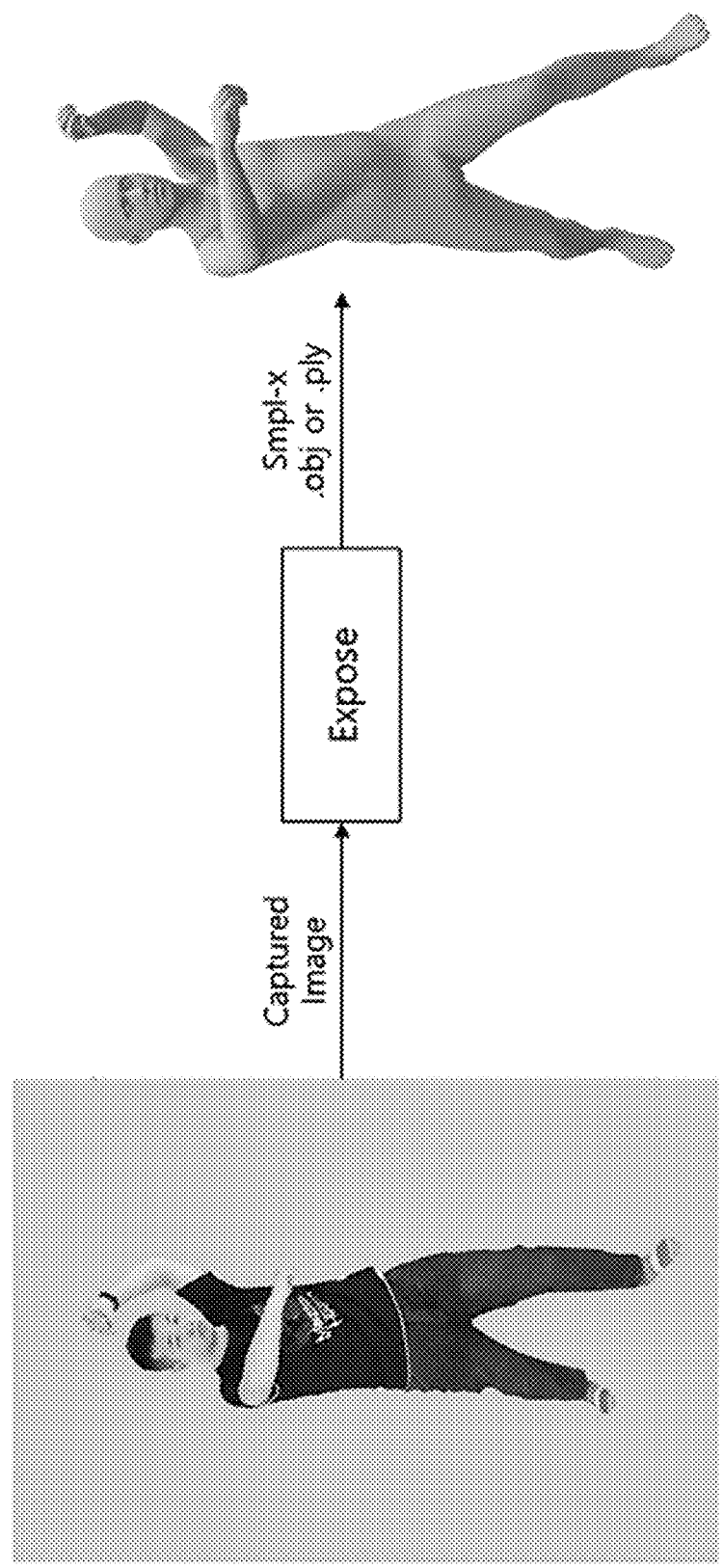
FIG. 10 is a diagram showing an input (2D image) and an output (3D mesh in SMPL format) of an expose deep learning model according to one embodiment of the present invention.
Figure 11E:
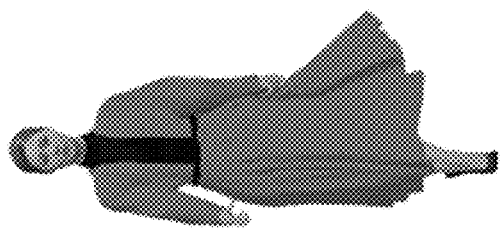
FIG. 11(a)-11(e) show exemplary screens of a process of generating a 3D editing model and actions according to one embodiment of the present invention, and includes (a) a volumetric head part, (b) a body of an SMPL model, (c) generating a new model and fitting costumes/shoes, (d) rigging an SMPL skeleton, and (e) retargeting and animating the body.
Figure 11D:
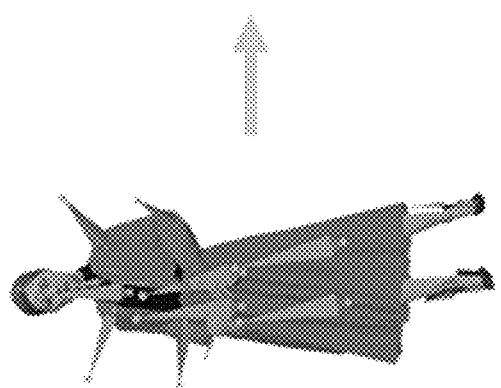
Figure 11C:
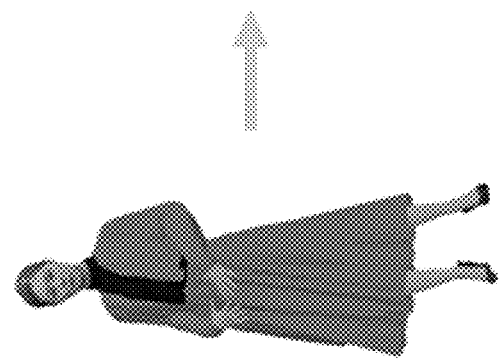
Figure 11A:
Figure 11B:
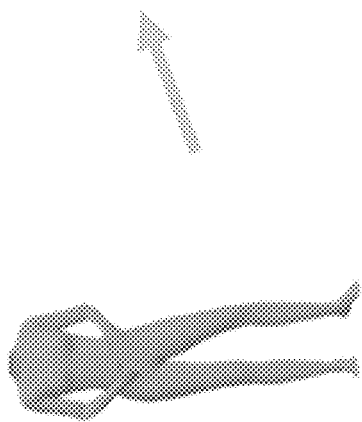

The above process is shown in FIG. 10. As shown in FIG. 10 as an example, the SMPL model may be estimated from the 2D image by an ExPose deep learning model. The expressive pose and shape revolution (ExPose) captures a body, face, and hand of a human from an RGB image of a human to generate a 3D Human in an SMPL-X format (see Non-Patent Document 7). The corresponding network predicts body pose (θb), hand pose (θh), facial pose (θf), shape (β), and expression (ψ).

The skinned multi-person linear (SMPL) model refers to a type of data format generated to elaborate the human body into a 3D mesh and is widely used in the fields of artificial intelligence and graphics. The SMPL-X is a model including a finger in the SMPL.

The SMPL model uses one image to find a human body included in the image, estimates a pose of the body, applies the estimated pose to a previously defined human body model, and outputs a human body model that is taking the pose.

The SMPL model includes shape parameters representing a body appearance and pose parameters representing joints and bones. In other words, the SMPL model includes a 3D mesh of the body appearance and pose (bone and joint) information of the 3D mesh.

In addition, features of the body are analyzed in the image and then a human body model is modified to have features similar to the features, so that a human body model is finally generated to have a form of a 3D mesh similar to the human contained in the image.

A 2D image does not have all 3D information of an original 3D object or human body. Accordingly, an error may inevitably exist in 3D information generated through inference or prediction from the 2D image.

In order to minimize the error in the process of converting the 2D image into 3D information (3D mesh), 3D information of the SMPL model is extracted from each of the 2D images of multiple views, and the most suitable viewpoint is selected from the extracted information. In other words, each accuracy (confidence) is calculated for the 2D images of the multiple views. The 2D images are sorted by the confidence and the 2D image having the highest confidence is converted into 3D information (3D mesh). A 3D mesh of a specific frame of volumetric metric data is projected with various viewpoints, so that 2D images of multiple views are obtained.

Meanwhile, the SMPL model may be generated from a 3D mesh of a specific frame or each keyframe. In other words, the SMPL model is generated in a specific frame and used continuously, or newly generated from the keyframe and used if necessary.

Next, the head part separated from the 3D mesh is transferred to the head part of the SMPL model, so that a 3D base model is generated (S50).

A mesh of the previously separated head part is used to transfer the volumetric head to the face of SMPL-X, so that a new 3D model (or a 3D base model) to be edited is generated.

A conventional scheme is used to transfer a face (see Non-Patent Document 6). For example, replacing, morphing or deforming the face may be applied. Alternatively a deep learning technology may be used to deform the face.

Meanwhile, preferably, the head part of each keyframe is transferred to the SMPL model, so that a 3D base model of the corresponding frame is generated.

Next, The step S60 of editing the pose sequence will be described.

In other words, a 3D pose of the keyframes or a sequence of the keyframes is edited, and a sequence of 3D poses (of all frames) is generated from the 3D poses of the edited keyframes.

Volumetric data is a sequence of 3D meshes composed of multiple series of frames. Through the step S20 of estimating a pose, a 3D pose of with respect to a 3D mesh of a specific frame may be estimated.

First, a 3D pose of each keyframe is estimated from each 3D mesh of a series of keyframes, so that a sequence of 3D poses of the series of keyframes is estimated. In other words, the 3D pose is estimated for keyframes only, so that a 3D pose sequence of the series of keyframes may be estimated. In this case, a 3D pose of an intermediate frame may be estimated by an interpolation with respect to the 3D pose of the keyframe.

Next, the sequence of 3D poses of the estimated keyframes is edited to generate a sequence of keyframes of new 3D poses. Particularly, a sequence of 3D poses of the estimated keyframes is edited. Editing of a sequence of 3D poses includes editing of a skeleton of 3D poses and editing of a sequence.

The editing of a skeleton of a 3D pose refers to editing of joints and bones of a 3D pose of a specific frame. Since the 3D pose is composed of joints and bones, the editing may be performed by changing positions of the joints or bones.

When the sequence of the 3D poses is edited, the order of the 3D poses is changed, another 3D pose is inserted, or an existing 3D pose is deleted. For example, when the keyframes are defined as kf1, kf2, kf3, kf4, . . . , and kfn, some orders may be changed like kf1, kf3, kf4, kf2, . . . . Alternatively, a sequence of 3D poses provided in advance in the form of a template may be imported and inserted. For example, the existing keyframe kf3 may be deleted and a sample sequence, such as ks1, ks2 and ks3, may be inserted, so that a new sequence of kf1, kf2, ks1, ks2, ks3, kf4, . . . , and kfn may be obtained.

Next, 3D poses of entire frames are estimated from keyframes of the new 3D poses, so that a sequence of 3D poses of the entire frames (hereinafter, a sequence of edited 3D poses) is generated. In other words, 3D poses of intermediate frames between the keyframes are estimated by interpolation. Positions of bones and joints of the intermediate frames are estimated from bones and joints of the keyframes by interpolation.

Next, the editing step S70 using the 3D base model will be described.

The 3D base model is dressed with costumes, accessories, shoes and the like, a skeleton of SMPL-X is rigged to add simple motion, and a retargeting technique of a body is used to move the rigged 3D model.

FIG. 11(a)-11(e) illustrate a process of editing the 3D base model. Particularly, FIG. 11(a)-11(e) illustrate a process of generating a 3D editing model, reflects a 3D pose sequence and then animates the 3D editing model.

Particularly, in the editing step S70 as shown in FIG. 2, first, a 3D editing model is generated by applying costumes such as new clothing, accessories, and shoes to the generated 3D base model (S71). Preferably, the 3D editing model may be generated by editing the 3D base model for each keyframe.

Next, a rigging operation is performed for the 3D editing model (S72). Since a separate rigging operation is not applied to the 3D editing model, the editing model cannot be moved. Accordingly, a rigging operation is required for the 3D editing model. Preferably, a rigging operation on the 3D editing model may be performed for each keyframe.

A 3D editing model is generated by fitting costumes to the 3D base model, and pose data of the SMPL model is used when the 3D editing model is rigged.

Accordingly, when the skeleton of SMPL-X is rigged to the newly generated 3D editing model, a 3D model with an animatable SMPL-X skeleton structure is finally generated.

Next, the 3D model is animated by applying the sequence of the 3D poses by using motion retargeting (S73). In other words, the motion retargeting is performed by applying the 3D pose sequence previously edited in the pose sequence editing step S60.

The motion retargeting is a technique of applying motion data of one character to another character. In other words, since the sequence of 3D poses is 3D motion data, animating may be performed by applying the sequence of 3D poses to the 3D editing model.

Meanwhile, a 3D base model is generated for each keyframe and edited to generate the 3D editing model. In addition, the previously edited sequence of 3D poses may be applied to the 3D editing model to perform animating. The edited sequence of 3D poses is a sequence from a corresponding keyframe to a next keyframe.

In addition, the order of the keyframes follows the order of the pose sequence. In other words, based on the keyframes of the pose sequence, animating is performed up to the next keyframe with the 3D editing model of the corresponding keyframe. Accordingly, when the order of the keyframes in the pose sequence is changed by the editing, animating is performed by using the 3D editing model of keyframes according to the changed order.

In addition, when new keyframes are inserted between a k-th keyframe and a (k+1)-th keyframe, animating is performed on a sequence of all frames up to the next keyframe ((k+1)-th keyframe) by using a 3D editing model of the k-th keyframe.

A 3D mesh model is output according to time with respect to the above motions. In addition, originally synthesized 3D volumetric data is replaced or inserted using the output 3D model, so that an edited 3D volumetric mesh sequence may be produced. When a new motion is added to a previously produced 3D volumetric sequence (or video) or costumes, accessories, hairstyles, makeup, and the like are changed, various effects may be generated.

FIGS. 12(a) and 12(b) show an original 3D volumetric sequence and an edited 3D volumetric sequence.

Finally, as shown in FIGS. 12(a) and 12(b), a volumetric sequence generated in addition to the original volumetric sequence may be obtained. The volumetric sequences are properly edited through the combination and integration therebetween, so that a volumetric model, which is difficult to edit and reprocess, can be edited and reprocessed.

The present invention made by the inventor has been described in detail according to the embodiments. However, the present invention is not limited to the embodiments, and may be various changed and modified without departing from the idea of the present invention.

The invention claimed is:

1. A method for editing 3D volumetric data, the method comprising the steps of:
   (a) receiving a 3D mesh sequence composed of a series of continuous frames;
   (b) estimating a 3D pose composed of joints and bones from the 3D mesh sequence;
   (c) separating a head part from a 3D mesh of a keyframe using the 3D pose;
   (d) estimating a 3D mesh and pose data of an SMPL model with respect to a specific keyframe of the 3D mesh sequence;
   (e) generating a 3D base model of the keyframe by transferring the head part to the 3D mesh of the SMPL model;
   (f) editing the estimated 3D pose of the keyframes, and generating a sequence of 3D poses of the entire frames from the 3D poses of the edited keyframes; and
   (g) editing the 3D base model of the keyframe to generate a 3D editing model, and animating the 3D editing model by applying the sequence of the 3D poses of the entire frame.

2. The method of claim 1, wherein step (c) includes:
   calculating a vector from a head joint to a neck joint as a direction vector of a skeleton;
   calculating a direction vector of a vertex from a predetermined point on the skeleton to a mesh vertex; and
   calculating an angle between the direction vector of the skeleton and the direction vector of the vertex, thereby separating a head part.

3. The method of claim 2, wherein step (c) includes:
   removing corresponding vertices and faces of other areas when a mesh of the head part contains the other areas after the head part is separated by calculating the angle between the direction vectors;
   detecting a position and coordinates of a closest vertex among vertices of the head parts from vertices of an excluded part corresponding to a head area required to be separated; and
   moving the detected vertex to the distorted portion.

4. The method of claim 1, wherein step (f) includes:
   estimating a 3D pose of keyframes from each 3D mesh of a series of keyframes to estimate a sequence of 3D poses of the series of keyframes;
   editing a sequence of 3D poses of the estimated keyframes to generate a sequence of keyframes of a new 3D pose; and
   estimating a 3D pose of entire frames from the keyframes of the new 3D pose to generate a sequence of 3D poses of the entire frames.

5. The method of claim 4, wherein, in step (f), the editing of the sequence of the 3D poses includes editing the sequence of 3D poses of the keyframe, in which an order of the 3D poses is changed, or another 3D pose is inserted or an existing 3D pose is deleted in the sequence.

6. The method of claim 4, wherein, in step (f), the sequence of the 3D poses of the entire frames is generated by estimating 3D poses of intermediate frames by interpolation from the keyframes of the 3D poses.

7. The method of claim 1, wherein step (g) includes:
   animating the 3D editing model by fitting a costume to the 3D base model to generate a 3D editing model, rigging the 3D editing model with a pose of the SMPL model, and using motion-retargeting.

8. The method of claim 7, when step (g) includes:
   retargeting a 3D editing model of a specific keyframe by using a 3D pose sequence from a corresponding frame to a next frame.

9. The method of claim 8, wherein, in step (g), an order of the keyframes of the 3D editing model depends on the order of the pose sequence.

* * * * *